US009347968B2

(12) United States Patent
Yagi

(10) Patent No.: US 9,347,968 B2
(45) Date of Patent: May 24, 2016

(54) ELECTRONIC DEVICE AND INPUT METHOD

(75) Inventor: Takeshi Yagi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 227 days.

(21) Appl. No.: 14/140,912

(22) PCT Filed: Jun. 29, 2012

(86) PCT No.: PCT/JP2012/066668
§ 371 (c)(1),
(2), (4) Date: Dec. 26, 2013

(87) PCT Pub. No.: WO2013/005665
PCT Pub. Date: Jan. 10, 2013

(65) Prior Publication Data
US 2014/0137630 A1 May 22, 2014

(30) Foreign Application Priority Data

Jul. 4, 2011 (JP) ................................. 2011-147929

(51) Int. Cl.
G01P 21/02 (2006.01)
G06F 3/0346 (2013.01)
G06F 3/01 (2006.01)

(52) U.S. Cl.
CPC ................ G01P 21/02 (2013.01); G06F 3/017 (2013.01); G06F 3/0346 (2013.01)

(58) Field of Classification Search
CPC ...................................................... G01P 21/02
See application file for complete search history.

(56) References Cited

U.S. PATENT DOCUMENTS

| 7,424,388 | B2 * | 9/2008 | Sato ......................... | A63F 13/06 345/156 |
| 7,844,415 | B1 * | 11/2010 | Bryant ................... | G01C 17/02 702/141 |
| 2010/0275166 | A1 * | 10/2010 | Jeon ......................... | G06F 3/017 715/863 |
| 2012/0047466 | A1 * | 2/2012 | Noda ...................... | G06F 3/011 715/848 |
| 2013/0194193 | A1 * | 8/2013 | Kawalkar ................ | G06F 3/041 345/173 |

FOREIGN PATENT DOCUMENTS

| JP | 2007-531113 | 11/2007 |
| JP | 2012-43194 | 3/2012 |
| WO | WO 2005/103863 | 11/2005 |

OTHER PUBLICATIONS

PCT International Search Report and Written Opinion of the International Searching Authority mailed Jul. 24, 2012 in corresponding International Patent Application No. PCT/JP2012/066668.

* cited by examiner

Primary Examiner — Hezron E Williams
Assistant Examiner — Mark A Shabman

(57) ABSTRACT

An electronic device includes a storage unit that stores reference data for executing each of functions, an acceleration sensor that detects acceleration of the electronic device in at least two axes perpendicular to each other, a motion detection unit that detects a consecutive motion of the electronic device based on the acceleration of the electronic device and generates data of the detected motion of the electronic device, a correction range determination unit that determines a correction range based on data of a motion in a predetermined section of the data of the motion of the electronic device, a correction unit that corrects the motion of the electronic device to a rectilinear motion when the motion of the electronic device is in the correction range, and an execution control unit that judges each of the functions to be executed based on the motion of the electronic device and the reference data.

7 Claims, 9 Drawing Sheets

| FUNCTION | OPERATION |
|---|---|
| PLAY | PATTEN 1 |
| FAST FORWARD | PATTEN 2 |
| REWIND | PATTEN 3 |
| ... | ... |

ELECTRONIC DEVICE AND INPUT METHOD

CROSS-REFERENCE TO RELATED APPLICATION

This is a Continuation Application of International Application No. PCT/JP2012/066668, filed Jun. 29, 2012, which claims priority to Japanese Patent Application No. 2011-147929, filed on Jul. 4, 2011. The contents of the aforementioned applications are incorporated herein by reference.

BACKGROUND

1. Field of the Invention

The present invention relates to an electronic device and an input method.

2. Description of Related Art

An electronic device such as a mobile phone or a portable information terminal having a triaxial acceleration sensor or the like is disclosed in, for example, Published Japanese Translation No. 2007-531113 of the PCT International Publication. In the electronic device disclosed in Published Japanese Translation No. 2007-531113 of the PCT International Publication, a motion interface is provided in which the motion of its own apparatus is detected by a triaxial acceleration sensor, and the motion of its own apparatus is used as an interface.

SUMMARY

However, since humans are not good at rectilinear motion, even if a user intends to move an electronic device so as to draw a straight line, the actual motion often draws a curve. For this reason, there is a problem in that the electronic device of the related art detects this motion as a curvilinear motion, and thus a function desired by the user may not be executed.

An aspect of the present invention is aimed at providing an electronic device and an input method capable of preventing an input operation from being performed due to a motion which is not intended by a user in the electronic device which uses a motion of the electronic device as an interface.

According to an aspect of the present invention, an electronic device is provided, including a storage unit configured to store reference data of a motion of the electronic device for executing each of functions; an acceleration sensor configured to detect acceleration of the electronic device in at least two axes perpendicular to each other; a motion detection unit configured to detect a consecutive motion of the electronic device on the basis of the acceleration of the electronic device in each axis detected by the acceleration sensor and generates data of the detected motion of the electronic device; a correction range determination unit configured to determine a reference direction and a reference position on the basis of data of a motion in a predetermined section, among the data of the motion of the electronic device generated by the motion detection unit, and determines a correction range which has, as boundaries, a plurality of straight lines intersecting a straight line with a predetermined threshold angle in the reference direction at the reference position; a correction unit configured to correct the motion of the electronic device to a rectilinear motion in the reference direction when the motion of the electronic device detected by the motion detection unit is in the correction range determined by the correction range determination unit; and an execution control unit configured to judge each of the functions to be executed on the basis of the motion of the electronic device and the reference data.

According to the aspect of the present invention, it is possible to prevent an input operation from being performed due to a motion which is not intended by a user in the electronic device which uses a motion of the electronic device as an interface.

DESCRIPTION OF EMBODIMENTS

Hereinafter, embodiments of the present invention will be described in detail with reference to the drawings.

First Embodiment

Figure 1:
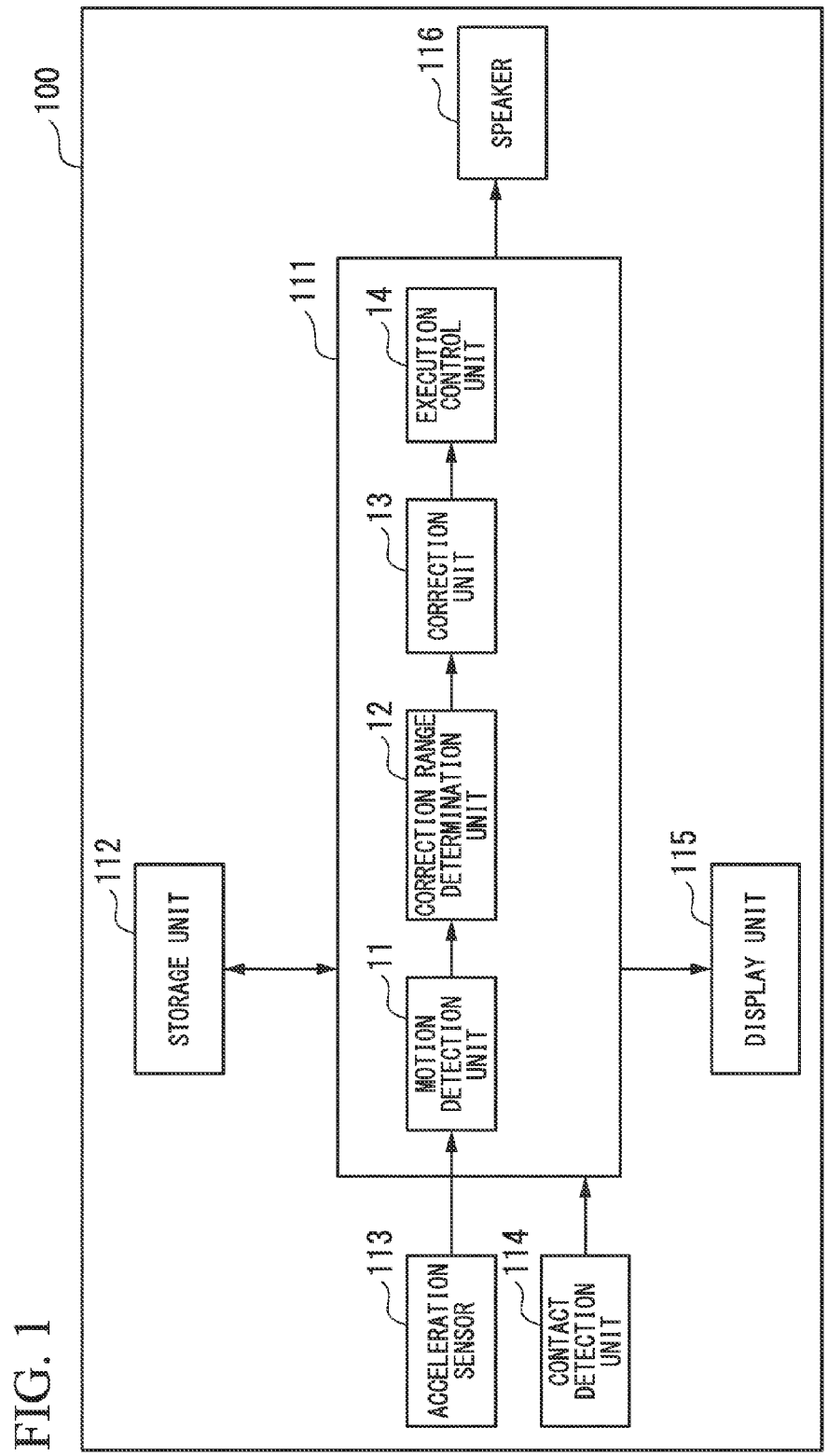
FIG. 1 is a block diagram illustrating a functional configuration of an electronic device according to the first embodiment of the present invention.

FIG. 1 is a block diagram illustrating a functional configuration of an electronic device 100 according to the first embodiment of the present invention.

The electronic device 100 is a portable information terminal such as a mobile phone, a smart phone, or a digital camera. The electronic device 100 includes a controller 111, a storage unit 112, an acceleration sensor 113, a contact detection unit 114, a display unit 115, and a speaker 116.

The acceleration sensor 113 is a triaxial acceleration sensor, and detects acceleration in each of three axes perpendicular to each other.

The contact detection unit 114 receives an operation from a user. The contact detection unit 114 includes a detection unit which is installed on a lateral surface of a face where a display surface of the display unit 115 is installed. The detection unit detects whether or not there is a contact, and a contact position.

The display unit 115 is, for example, a liquid crystal display panel or an organic EL panel, and displays an image. A touch panel (not illustrated) is provided on the display surface of the display unit 115.

The speaker 116 is a general speaker and outputs sound.

The storage unit 112 stores reference data of a motion of the electronic device 100 for executing each function.

The controller 111 comprehensively controls the each units of the electronic device 100. The controller 111 includes a motion detection unit 11, a correction range determination unit 12, a correction unit 13, and an execution control unit 14.

When the contact detection unit 114 detects a contact, the motion detection unit 11 detects a consecutive motion in its own electronic device on the basis of acceleration in each axis detected by the acceleration sensor 113.

Specifically, the motion detection unit 11 judges that an input operation is performed by gesture in a case where the acceleration sensor 113 continuously detects acceleration of a predetermined value or more for a predetermined time or more. In addition, the motion detection unit 11 generates data of a motion of its own electronic device in a three-dimensional space with the passage of time on the basis of a time clocked by a clocking unit (not illustrated) and acceleration in each axis detected by the acceleration sensor 113.

The correction range determination unit 12 reads data of a motion in a predetermined section from the motion data of its own electronic device generated by the motion detection unit 11, determines a reference direction and a reference position on the basis of the motion data in the predetermined section, and determines a correction range which has, as boundaries, a plurality of straight lines intersecting a straight line with a predetermined angle in the reference direction at the reference position.

Specifically, the correction range determination unit 12 sets, as the correction range, inside of a cone which has the reference position as a vertex, the straight line in the reference direction as a generatrix, and the predetermined angle as an angle of a lateral surface of the generatrix. Here, the predetermined section in the present embodiment is a section from a predetermined time t1 to a predetermined time (t1+t2). Here, t1 and t2 are positive numbers. Details of a method of determining the correction range will be described later.

The correction unit 13 corrects a motion of its own electronic device to a rectilinear motion in the reference direction in a case where the motion of its own electronic device detected by the motion detection unit 11 is in the correction range determined by the correction range determination unit 12.

The execution control unit 14 judges a function to be executed on the basis of the motion of its own electronic device corrected by the correction unit 13 and reference data stored by the storage unit 112, and outputs a command signal for executing the function to each units.

Figures 2, 3:
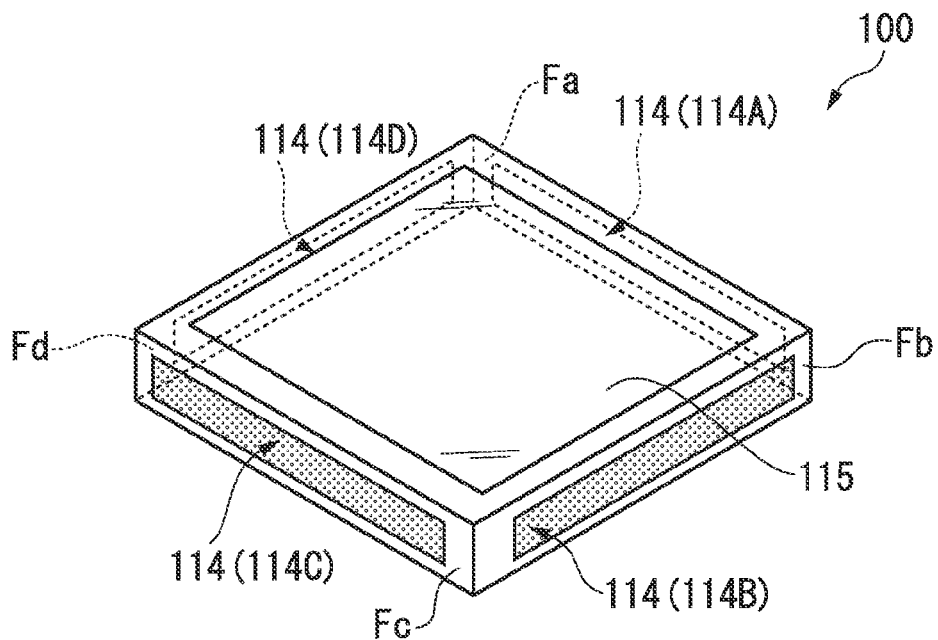
FIG. 2 is a perspective view illustrating an exterior configuration of the electronic device according to the first embodiment.
FIG. 3 is a schematic diagram illustrating a data structure and a data example of an operation table stored in a storage unit according to the first embodiment.

FIG. 2 is a perspective view illustrating an exterior configuration of the electronic device 100 according to the present embodiment.

A casing of the electronic device 100 holds the display unit 115 and the contact detection unit 114.

The display unit 115 is provided on a plate surface of the casing. The surface of the casing on which the display unit 115 is provided is hereinafter referred to as a display surface.

The contact detection unit 114 is provided on four lateral surfaces Fa to Fd corresponding to four sides surrounding the display surface of the casing. Hereinafter, for convenience of description, the contact detection unit 114 provided on the lateral surface Fa is indicated by a contact detection unit 114A, the contact detection unit 114 provided on the lateral surface Fb is indicated by a contact detection unit 114B, the contact detection unit 114 provided on the lateral surface Fc is indicated by a contact detection unit 114C, and the contact detection unit 114 provided on the lateral surface Fd is indicated by a contact detection unit 114D. In addition, the reference signs A to D are omitted in matters common to the contact detection units 114A to 114D, which are thus simply referred to as a "contact detection unit 114" or "each contact detection unit 114". The contact detection units 114A to 114D detect whether or not there is a contact from outside (for example, a user), and a contact position, on the each lateral surfaces Fa to Fd.

FIG. 3 is a schematic diagram illustrating a data structure and a data example of an operation table stored by the storage unit 112 according to the present embodiment. As illustrated, the operation table is data with a two-dimensional table form which has rows and columns, and has respective item columns of a function and an operation. The row of the table is present for each function.

The function can be executed by the electronic device 100. The operation is data indicating an operation for executing the function, and is reference data of a motion of the electronic device 100 detected by the motion detection unit 11 when the user performs the above operation.

In the example illustrated in FIG. 3, an operation for "play" of music or the like is a "pattern 1", an operation for "fast forward" is a "pattern 2", and an operation for "rewind" is a "pattern 3".

Figure 4A:
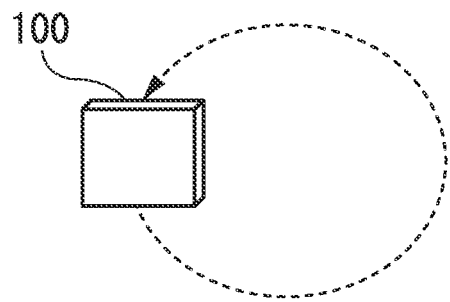
FIG. 4A is an image illustrating an example of a gesture operation according to the first embodiment.
Figure 4B:
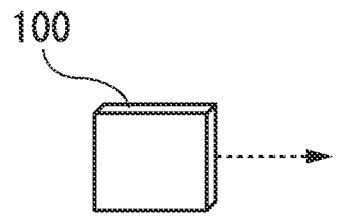
FIG. 4B is an image illustrating an example of a gesture operation according to the first embodiment.
Figure 4C:
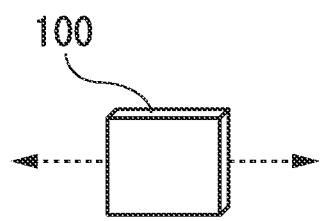
FIG. 4C is an image illustrating an example of a gesture operation according to the first embodiment.

FIGS. 4A to 4C are images illustrating an example of a gesture operation according to the present embodiment.

FIG. 4A is a diagram illustrating the operation "pattern 1". The operation "pattern 1" is a gesture for moving the electronic device 100 so as to draw a circle. In addition, FIG. 4B is a diagram illustrating the operation "pattern 2". The operation "pattern 2" is a gesture for moving the electronic device 100 linearly. Further, FIG. 4C is a diagram illustrating the operation "pattern 3". The operation "pattern 3" is a gesture for shaking the electronic device 100.

Figure 5:
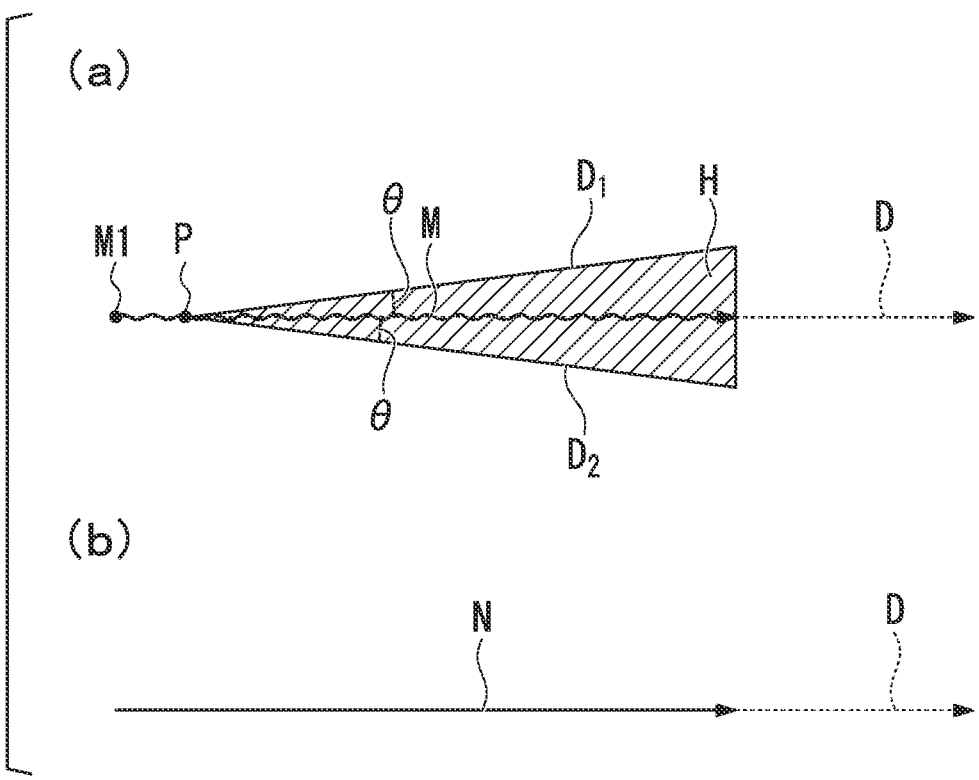
FIG. 5 is a diagram for explaining a correction process according to the first embodiment.
Figure 6:
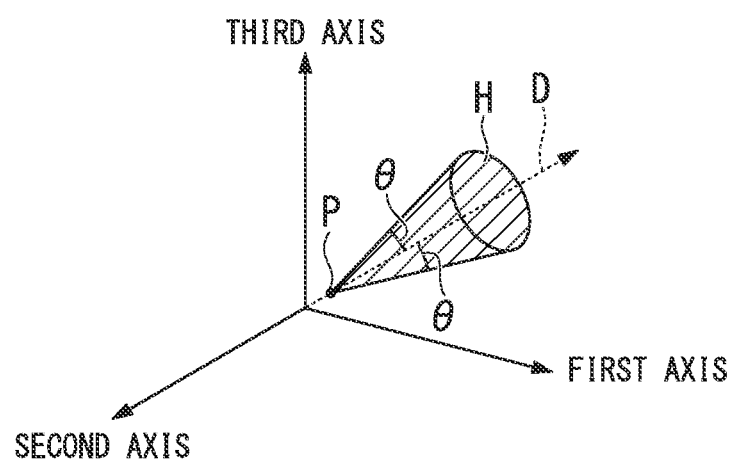
FIG. 6 is a diagram for explaining a correction process according to the first embodiment.

Next, with reference to FIGS. 5 and 6, a description will be made of a process of correcting a motion of its own electronic device detected by the motion detection unit 11. FIGS. 5 and 6 are diagrams for explaining a correction process according to the present embodiment.

FIG. 5($a$) illustrates a motion M detected by the motion detection unit 11. First, the correction range determination unit 12 sets a position after a predetermined time t1 (for example, ten milliseconds) from motion start M1, as a reference position P in relation to the motion M. Next, the correction range determination unit 12 sets a direction of the motion after a predetermined time t2 (for example, one millisecond) from the reference position P, as a reference direction D. Subsequently, the correction range determination unit 12 determines a correction range H which has, as boundaries, a plurality of straight lines $D_1$ and $D_2$ intersecting the straight line in the reference direction D at the reference position P with a predetermined threshold angle θ.

In addition, the correction unit 13 corrects the motion M to a rectilinear motion b in the reference direction D in a case where the entire motion M is in the correction range H. FIG. 5($b$) illustrates a rectilinear motion N obtained by correcting the motion M.

FIG. 6 is a diagram illustrating the correction range H in three axes in which the acceleration sensor 113 according to the present embodiment detects acceleration.

A first axis, a second axis, and a third axis illustrated in FIG. 6 are axes in which the acceleration sensor 113 detects acceleration, and are perpendicular to each other. As illustrated, the correction range H is inside of a cone which has the reference position P as a vertex, the straight line in the reference direction D as a generatrix, and the threshold angle θ as an angle of a lateral surface for the generatrix.

Figure 7:
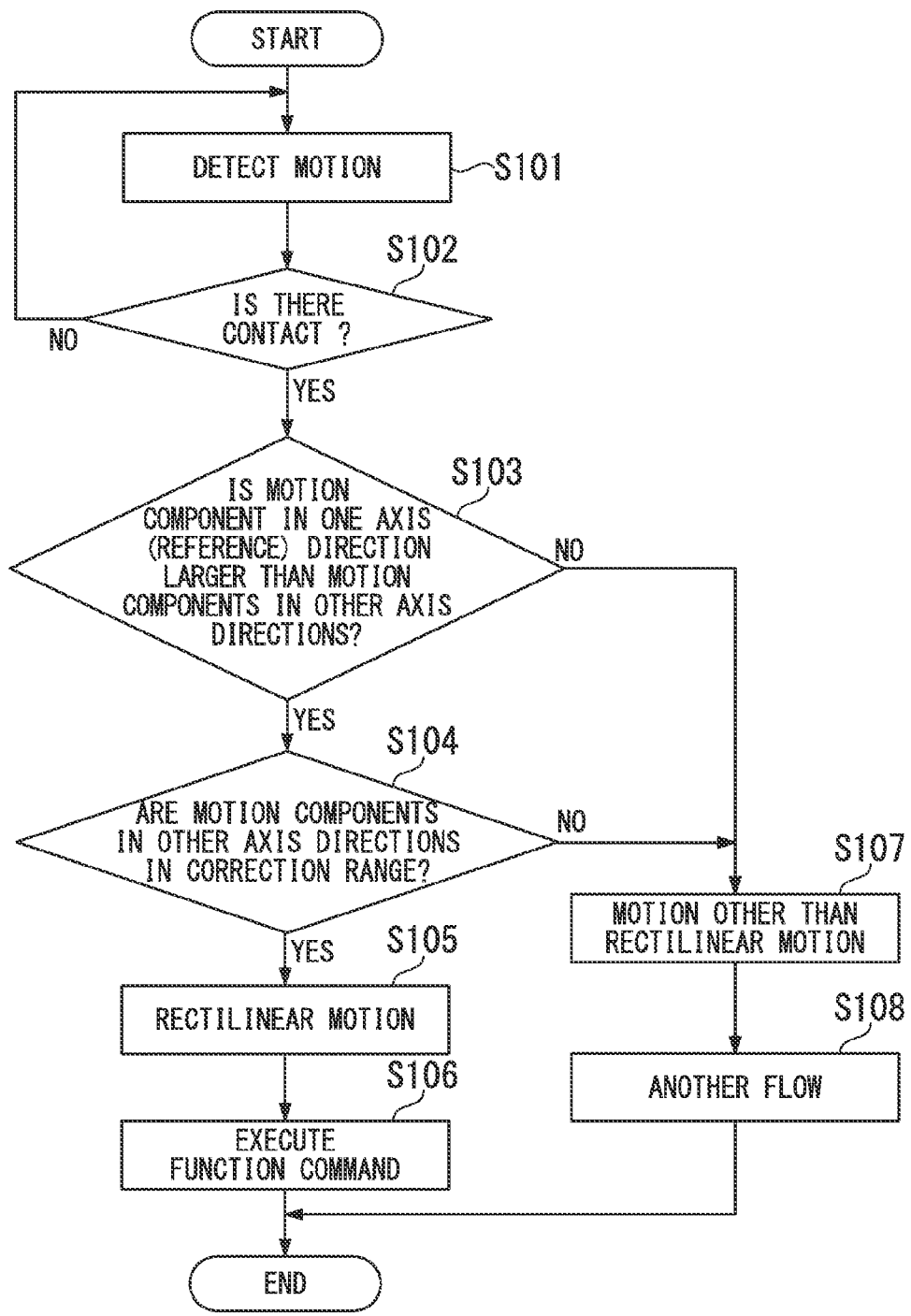
FIG. 7 is a flowchart illustrating procedures of an input judgment operation according to the first embodiment.

Next, with reference to FIG. 7, a description will be made of an input judgment operation in the electronic device 100 according to the present embodiment. FIG. 7 is a flowchart illustrating procedures of an input judgment operation according to the present embodiment.

First, the motion detection unit 11 of the controller 111 detects a motion of the electronic device 100 with the passage of time on the basis of acceleration detected by the acceleration sensor 113 (step S101).

Next, the controller 111 judges whether or not the contact detection unit 114 detects a contact (step S102). In other words, the controller 111 judges whether or not a user grasps (holds) the electronic device 100. If the contact detection unit 114 does not detect a contact (step S102: No), the flow returns to step S101.

On the other hand, if the contact detection unit 114 detects a contact (step S102: Yes), the correction range determination unit 12 of the controller 111 judges whether or not a vector (motion component) in the reference direction is larger than vectors (motion components) in other directions in the entire motion M detected by the motion detection unit 11 (step S103). Specifically, the correction range determination unit 12 sets a position after a predetermined time t1 from motion start M1, as a reference position P, and sets a direction of the motion after a predetermined time t2 from the reference position P, as a reference direction D, in relation to the motion M detected by the motion detection unit 11. In addition, the correction range determination unit 12 calculates motion components of the motion M in the reference direction and other directions, and judges whether or not the motion component in the reference direction is larger than the motion components in the other directions.

If the motion component in the reference direction in the motion M is larger than the motion components in the other directions (step S103: Yes), the correction range determination unit 12 determines a correction range H, and judges whether or not the motion components in the other directions are in the correction range H (step S104). At this time, the correction range determination unit 12 determines, as the correction range H, inside of a cone which has the reference position P as a vertex, the straight line in the reference direction D as a generatrix, and a threshold angle θ as an angle of a lateral surface for the generatrix.

In a case where the motion components in the other directions are in the correction range H (step S104: Yes), the correction unit 13 of the controller 111 corrects the motion M detected by the motion detection unit 11 to a rectilinear motion N in the reference direction D (step S105).

In addition, the execution control unit 14 reads a function corresponding to the rectilinear motion N from the storage unit 112, and outputs a command signal for executing the read function to the respective units (step S106).

On the other hand, in a case where the magnitude of the motion component in the reference direction in the motion M is equal to or smaller than the magnitudes of the motion components in the other directions (step S103: No), or the motion components in the other directions are out of the correction range H (step S104: No), the execution control unit 14 judges that the motion is a motion other than a rectilinear motion (step S107), and proceeds to another flow (step S108).

As above, according to the present embodiment, the electronic device 100 corrects the detected motion M to the rectilinear motion N in a case where the detected motion M is in the correction range H based on the reference direction and the predetermined angle θ.

For this reason, when a user moves the electronic device 100 with an intention of moving the electronic device linearly, even if an actual motion of the electronic device 100 draws a curve, the motion is judged as a rectilinear motion. Accordingly, the user can perform a gesture operation as intended. In other words, it is possible to prevent an input operation from being performed due to a motion which is not intended by the user.

Second Embodiment

Next, the second embodiment of the present invention will be described.

Figure 8:
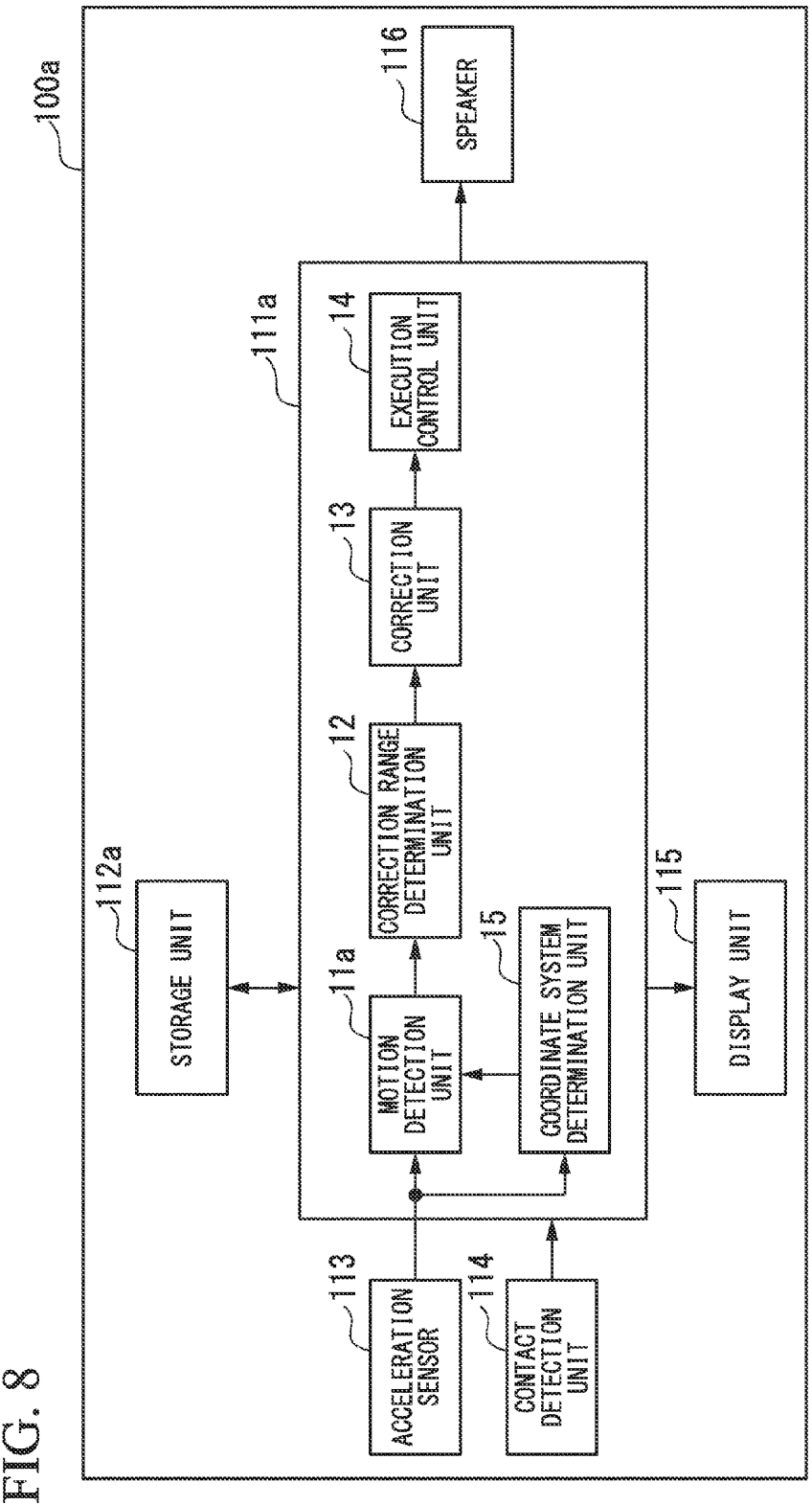
FIG. 8 is a block diagram illustrating a functional configuration of an electronic device according to a second embodiment of the present invention.

FIG. 8 is a block diagram illustrating a functional configuration of an electronic device 100a according to the present embodiment.

In FIG. 8, the same parts as in the electronic device 100 illustrated in FIG. 1 are given the same reference numeral, and description thereof will be omitted. A controller 111a of the electronic device 100a according to the present embodiment includes a coordinate system determination unit 15 in addition to the configuration of the controller 111 of the electronic device 100 according to the first embodiment.

Reference data stored by a storage unit 112a includes a direction of a motion in an XYZ orthogonal coordinate system. The XYZ orthogonal coordinate system is a reference coordinate system for judging a direction of a motion for a user.

The XYZ orthogonal coordinate system will be described later. The storage unit 112a stores different functions by correlating the different functions with the same motion depending on a motion direction.

The coordinate system determination unit 15 judges the gravity direction on the basis of acceleration detected by the acceleration sensor 113, and determines an XYZ orthogonal coordinate system which has the judged gravity direction as a Z direction, a direction in which the display surface of the display unit 115 faces on an XY plane perpendicular to the Z direction as an X direction, and a direction perpendicular to the X direction on the XY plane as a Y direction. A relationship between a direction of the display surface and a direction of each axis in which the acceleration sensor 113 detects acceleration is stored in the storage unit 112a in advance. In addition, the coordinate system determination unit 15 notifies a motion detection unit 11a of the determined XYZ orthogonal coordinate system. Specifically, the coordinate system determination unit 15 outputs data indicating a relationship between each axis in which the acceleration sensor detects acceleration and the XYZ orthogonal coordinate system, to the motion detection unit 11a.

The motion detection unit 11a detects a motion of its own electronic device in the XYZ orthogonal coordinate system on the basis of acceleration in each axis detected by the acceleration sensor 113.

Figure 9:
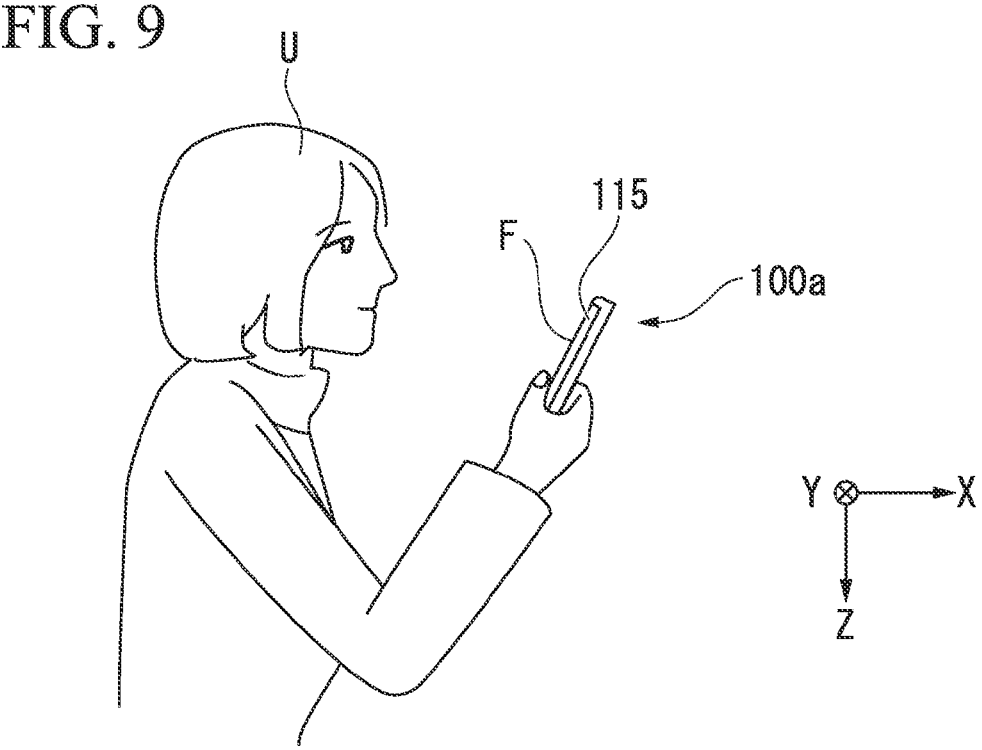
FIG. 9 is a diagram for explaining an XYZ orthogonal coordinate system according to the second embodiment.

FIG. 9 is a diagram for explaining the XYZ orthogonal coordinate system according to the present embodiment.

As illustrated, typically, a user U mostly holds the electronic device so that the display surface F of the display unit 115 of the electronic device 100a faces the user. For this reason, a direction in which the display surface F faces is set as one direction, and then the XYZ orthogonal coordinate system is determined. Specifically, in the XYZ orthogonal coordinate system, the gravity direction is set as a Z direction. In addition, a plane perpendicular to the Z direction is set as an XY plane, a direction in which the display surface F of the display unit 115 faces on the XY plane is set as an X direction, and a direction perpendicular to the X direction on the XY plane is set as a Y direction.

Figure 10A:
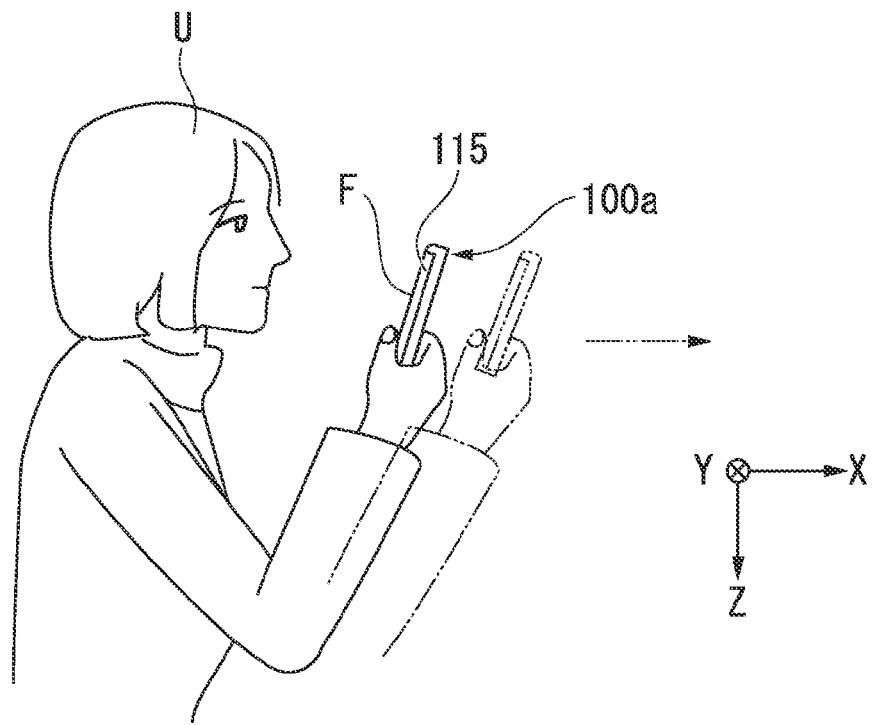
FIG. 10A is an image illustrating an example of a gesture operation according to the second embodiment.
Figure 10B:
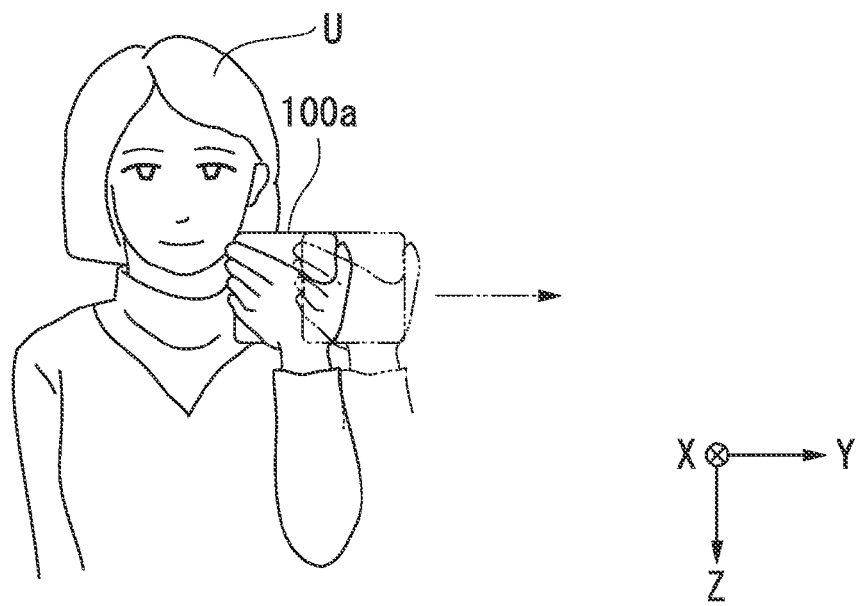
FIG. 10B is an image illustrating an example of a gesture operation according to the second embodiment.

FIGS. 10A and 10B are images illustrating an example of a gesture operation according to the present embodiment.

FIG. 10A is a diagram illustrating an operation "pattern A" for executing a function A. The operation "pattern A" is a gesture for moving the electronic device 100 linearly in the X direction. In other words, operation "pattern A" is a gesture for the user moving the electronic device 100 linearly forward. In addition, FIG. 10B is a diagram illustrating an operation "pattern B" for executing a function B. The operation "pattern B" is a gesture for moving the electronic device 100 linearly in the Y direction. In other words, operation "pattern B" is a gesture for the user moving the electronic device 100 linearly to the left.

As above, in the electronic device 100a according to the present embodiment, functions to be executed are different depending on motion directions even for the same motion.

Figure 11:
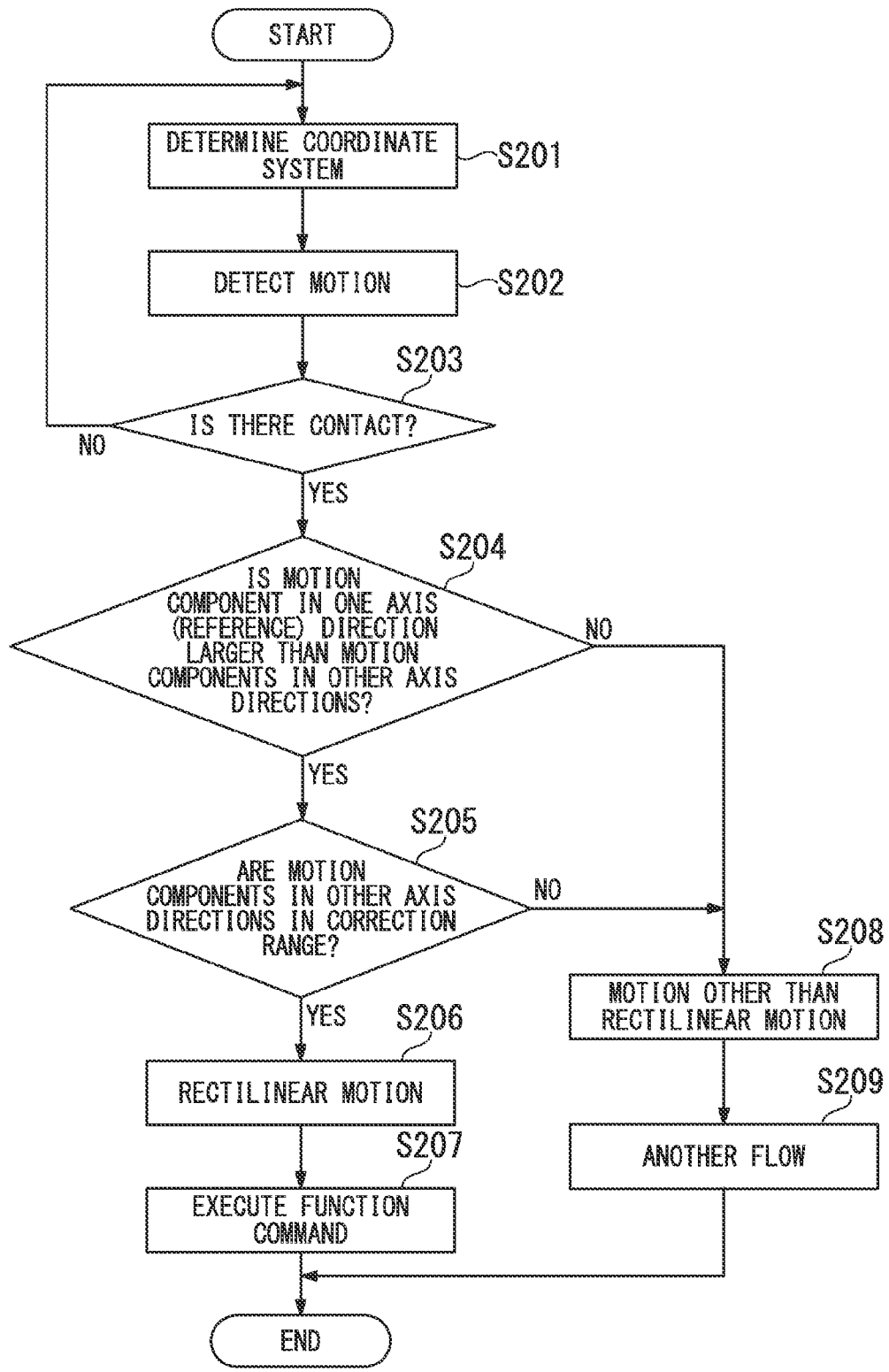
FIG. 11 is a flowchart illustrating procedures of an input judgment operation according to the second embodiment.

Next, with reference to FIG. 11, a description will be made of an input judgment operation in the electronic device 100a according to the present embodiment. FIG. 11 is a flowchart illustrating procedures of an input judgment operation according to the present embodiment.

First, the coordinate system determination unit 15 of the controller 111a determines an XYZ orthogonal coordinate system on the basis of acceleration detected by the acceleration sensor 113 (step S201).

Subsequently, the motion detection unit 11a of the controller 111a detects a motion of the electronic device 100 in the XYZ orthogonal coordinate system determined in step S201 on the basis of the acceleration detected by the acceleration sensor 113 (step S202).

Processes from steps S203 to S206 are the same as the processes from steps S102 to S105 described above.

Subsequently to step S206, the execution control unit 14 of the controller 111a reads a function corresponding to the rectilinear motion in the reference direction D from the storage unit 112a, and outputs a command signal for executing the read function to each of the units (step S207).

Processes in steps S208 and S209 are the same as the processes in steps S107 and S108 described above.

In addition, in the present embodiment, the reference coordinate system (XYZ orthogonal coordinate system) is determined based on the gravity direction and a direction of the display surface F. However, for example, a reference coordinate system in which a direction for the user U can be judged may be determined using other methods such as a method of determining a reference coordinate system on the basis of a value detected by the contact detection unit 114.

As above, according to the present embodiment, an XYZ orthogonal coordinate system is determined, and a function to be executed is judged based on a motion of the electronic device 100a in the determined XYZ orthogonal coordinate system. Accordingly, different functions can be correlated even with the same motion depending on motion directions. In other words, in a case where an electronic device is moved in a different direction even in the same motion, a different function can be executed.

In addition, a program for realizing the respective steps illustrated in FIG. 7 or 11 may be recorded on a computer-readable recording medium, and the program recorded on the recording medium may be read by a computer system so as to be executed, thereby performing process of judging an input by a gesture operation. In addition, the term "computer system" described here may include an OS or hardware such as peripheral devices.

Further, the term "computer-readable recording medium" refers to a writable nonvolatile memory such as a Floppy (registered trademark) disk, a magento-optical disc, an SD card, or a flash memory, a portable medium such as a CD-ROM, or a storage device such as a hard disk built in the computer system.

In addition, the term "computer-readable recording medium" also includes one which holds a program for a specific time such as a nonvolatile memory (dynamic random access memory (DRAM)) of the computer system, which becomes a server or a client when the program is transmitted via a network such as the Internet or a communication line such as a telephone line.

Further, the program may be transmitted from a computer system in which the program is stored in a storage device or the like to other computer systems via a transmission medium, or using a transmission wave in the transmission medium. Here, the term "transmission medium" which transmits the program refers to a medium having a function of transmitting information, including a network (communication network) such as the Internet or a communication line such as a telephone line.

Furthermore, the program may be used to realize some of the above-described functions.

Moreover, the program may be a so-called differential file (differential program) which can realize the above-described functions in combination with a program which has already been recorded in a computer system.

As above, although the embodiments of the present invention have been described in detail with reference to the drawings, a specific configuration is not limited to the embodiments, and includes various design modifications and the like within the scope without departing from the spirit of the present invention.

What is claimed is:

1. An electronic device comprising:
    an acceleration sensor configured to detect acceleration of the electronic device;
    a motion detection unit configured to detect a motion of the electronic device on the basis of an acceleration detected by the acceleration sensor and generate data of the detected motion of the electronic device;
    a correction range determination unit configured to determine a reference direction and a reference position on the basis of data of a motion in a predetermined section, among the data of the motion of the electronic device generated by the motion detection unit, and determine a correction range which has, as boundaries, a plurality of straight lines intersecting a straight line with a predetermined angle in the reference direction at the reference position; and
    a correction unit configured to correct the data of the motion of the electronic device when the motion of the electronic device detected by the motion detection unit is in the correction range determined by the correction range determination unit.

2. The electronic device according to claim 1,
    wherein the correction range determination unit determines the reference direction and the reference position in a three-dimensional space, and sets, as the correction range, an inside of a cone which has the reference position as a vertex, the straight line in the reference direction as a generatrix, and the predetermined threshold angle as an angle of a lateral surface for the generatrix.

3. The electronic device according to claim 2, further comprising a coordinate system determination unit configured to judge a gravity direction on the basis of acceleration of the electronic device detected by the acceleration sensor, and determine a reference coordinate system having the judged gravity direction as one axis,
   wherein the motion detection unit detects the motion of the electronic device in the reference coordinate system.

4. The electronic device according to claim 3, further comprising a display unit,
   wherein the coordinate system determination unit determines the reference coordinate system on the basis of a direction to which a display surface of the display unit faces and the gravity direction.

5. The electronic device according to claim 1, further comprising a contact detection unit that detects whether or not there is a contact by a user,
   wherein the motion detection unit detects a motion of the electronic device only when the contact detection unit detects a contact.

6. The electronic device according to claim 1,
   wherein the correction unit corrects the data of the motion of the electronic device to a rectilinear motion in the reference direction when the motion of the electronic device detected by the motion detection unit is in the correction range determined by the correction range determination unit.

7. An input method comprising:
   detecting a motion of an electronic device on the basis of acceleration of the electronic device detected by an acceleration sensor which detects acceleration of the electronic device, and generating data of the detected motion of the electronic device;
   determining a reference direction and a reference position on the basis of data of a motion in a predetermined section, among the generated data of the motion of the electronic device, and determining a correction range which has, as boundaries, a plurality of straight lines intersecting a straight line with a predetermined angle in the reference direction at the reference position; and
   correcting the data of the motion of the electronic device when the detected motion of the electronic device is in the determined correction range.

* * * * *